(12) United States Patent
Gerhardt

(10) Patent No.: US 7,013,862 B2
(45) Date of Patent: Mar. 21, 2006

(54) METHOD FOR OPERATING AN INTERNAL COMBUSTION ENGINE

(75) Inventor: Juergen Gerhardt, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 10/380,582

(22) PCT Filed: Sep. 6, 2001

(86) PCT No.: PCT/DE01/03416

§ 371 (c)(1),
(2), (4) Date: Mar. 14, 2003

(87) PCT Pub. No.: WO02/25088

PCT Pub. Date: Mar. 28, 2002

(65) Prior Publication Data

US 2004/0011322 A1   Jan. 22, 2004

(30) Foreign Application Priority Data

Sep. 22, 2000   (DE) ............................... 100 47 003

(51) Int. Cl.
*F02D 41/18* (2006.01)

(52) U.S. Cl. ............... 123/295; 123/443; 123/481; 123/673; 701/103

(58) Field of Classification Search ............ 123/295, 123/673, 443, 481, 198 F, 198 DB, 198 DC; 701/103, 110, 111, 112
See application file for complete search history.

(56) References Cited

U.S. PATENT DOCUMENTS 5,613,480 A * 3/1997 Katoh et al. ................. 123/673
6,209,526 B1 * 4/2001 Sun et al. .................... 123/481

(Continued)

FOREIGN PATENT DOCUMENTS

| DE | 35 13 656 A | 10/1985 |
| DE | 39 04 832 A | 8/1990 |
| DE | 198 59 018 A | 6/2000 |
| DE | 199 09 658 A | 9/2000 |
| WO | WO 00/08308 | * 2/2000 |

(Continued)

*Primary Examiner*—Hai Huynh
(74) *Attorney, Agent, or Firm*—Michael J. Striker

(57) ABSTRACT

The invention concerns a method for operating an internal combustion engine (1, 18) having a plurality of combustion chambers (4), in the case of which the combustion chambers (4) are charged with fuel and air or with a fuel/air mixture. In order to prevent torque jumps from occurring when cylinders (3) of the internal combustion engine (1, 18) are shut down and when switching the operating mode of direct-injection internal combustion engines (18), it is proposed that the charging of the combustion chambers (4) with fuel and air or with a fuel/air mixture be controlled individually via open-loop or closed-loop control for each combustion chamber (4). In the case of a direct-injection internal combustion engine (18), a certain number of combustion chambers (4) can be operated with homogenous-charge operation, and the remaining combustion chambers (4) can be operated with stratified-charge operation in accordance with the level of torque required.

23 Claims, 6 Drawing Sheets

U.S. PATENT DOCUMENTS

| | | | |
|---|---|---|---|
| 6,321,714 B1 * | 11/2001 | Grizzle et al. | 123/295 |
| 6,411,885 B1 * | 6/2002 | Grizzle et al. | 701/104 |
| 6,446,596 B1 * | 9/2002 | Moser et al. | 123/295 |
| 6,484,688 B1 * | 11/2002 | Strauss | 123/298 |
| 6,484,709 B1 * | 11/2002 | Strauss | 123/679 |
| 6,505,600 B1 * | 1/2003 | Tetzlaff | 123/295 |
| 6,532,932 B1 * | 3/2003 | Strauss | 123/295 |
| 6,659,083 B1 * | 12/2003 | Gaessler et al. | 123/443 |
| 6,935,308 B1 * | 8/2005 | Nakamoto et al. | 123/395 |

FOREIGN PATENT DOCUMENTS

| | | |
|---|---|---|
| WO | 00 53912 A | 9/2000 |

* cited by examiner

METHOD FOR OPERATING AN INTERNAL COMBUSTION ENGINE

BACKGROUND OF THE INVENTION

The invention concerns a method for operating an internal combustion engine having a plurality of combustion chambers, in the case of which the combustion chambers are charged with fuel and air or with a fuel/air mixture.

The invention also concerns an internal combustion chamber having a plurality of combustion chambers that are capable of being charged with fuel and air or with a fuel/air mixture. Furthermore, the present invention concerns an electronic control unit for an internal combustion engine of this type.

The invention also concerns a memory element for an electronic control unit of an internal combustion engine, in which said memory element a computer program is stored that can be run on a computing element, in particular on a microprocessor. The memory element is developed, in particular, as a read-only memory, a random-access memory, or as a flash memory. Finally, the invention concerns a computer program as well.

The invention concerns multiple-cylinder internal combustion engines with fuel injection, i.e., conventional internal combustion engines with manifold injection as well as direct-injection internal combustion engines having a more modern design. In the case of an internal combustion engine with manifold injection, a fuel/air mixture is produced in an intake manifold of the internal combustion engine and then charged in the combustion chambers of the internal combustion engine. In the case of a direct-injection internal combustion engine, air alone enters the combustion chambers via the intake manifold. Depending on the operating mode of the internal combustion engine, fuel is injected directly into the combustion chambers of the internal combustion engine at different points in time during a power cycle.

With regard for conventional internal combustion engines with manifold injection, it is known from the related art that a specified number of cylinders can be shut down in certain operating states of the internal combustion engine, e.g., in part-load operation or overrun, in order to reduce fuel consumption and exhaust-gas emissions. The cylinders are shut down by halting supply of fuel/air mixture to the cylinders to be shut down. This is accomplished by shutting down intake and/or exhaust valves via which the fuel/air mixture enters the combustion chambers and/or exhaust gases leave the chambers after the fuel/air mixture is combusted. The known method for shutting down cylinders has the disadvantage that only a specified number of cylinders can be shut down. Moreover, sudden torque jumps that are clearly noticeable can occur in certain operating states when the cylinders are shut down or activated.

Direct-injection internal combustion engines can be operated in different operating modes. A distinction is made between stratified-charge operation, which is used with lower loads in particular, and homogeneous operation, in which greater loads are placed on the internal combustion engine. Further operating modes are, e.g., an operating mode for catalytic-converter heating, an operating mode for desulfurization of a catalytic exhaust converter, or for NOx (oxides of nitrogen) regeneration of a catalytic exhaust converter.

In stratified-charge operation, fuel is injected into a combustion chamber during a compression phase in such a fashion that, at the point of ignition, a fuel cloud is located in the immediate vicinity of a spark plug. This injection can take place in different ways. For example, the injected fuel cloud can be located at the spark plug during or immediately after injection, and is ignited by said spark plug. It is also possible that the injected fuel cloud is first directed to the spark plug by means of a motion of the charge, and then ignited. In both of these combustion processes, a stratified charge is present, not uniform fuel distribution.

The advantage of stratified-charge operation lies in the fact that it allows the internal combustion engine to respond to the lower loads being placed on it using a very small amount of fuel. Larger loads cannot be responded to fully using stratified-charge operation.

In homogeneous operation, which is designed to respond to said larger loads, fuel is injected during an intake phase so it can be swirled and, therefore, distributed in the combustion chamber immediately. In this regard, homogeneous operation is similar to the operating method of conventional internal combustion engines with manifold injection. Homogeneous operation can also be used with lower loads, if necessary.

In stratified-charge operation, the throttle valve in the intake manifold leading to the combustion chamber is opened wide, and combustion is controlled via open-loop and/or closed-loop control essentially only by means of the fuel mass to be sprayed. In homogeneous operation, the throttle valve is opened and/or closed depending on the level of torque required, and the fuel mass to be sprayed is controlled via open-loop and/or closed-loop control depending on the inducted air mass.

In both operating modes, i.e., in stratified-charge operation and homogeneous operation, the fuel mass to be sprayed is also governed via open-loop and/or closed-loop control to a value that is optimal in terms of fuel economy, exhaust-gas reduction, and the like, depending on a plurality of further operating variables. Different types of open-loop and/or closed-loop control are used in the two operating modes.

During steady-state operation of a direct-injection internal combustion engine, operating states are possible in which the full level of torque output by the internal combustion engine in the homogeneous operation is not required, even though homogenous operation is requested based on a setpoint torque required by the internal combustion engine, i.e., due to a load being placed on the internal combustion engine. In these cases, due to the relatively rich fuel/air mixture in homogeneous operation (lambda=approx. 1), fuel consumption is relatively high, even though the full level of torque generated in homogeneous operation is not required.

During dynamic operation of the internal combustion engine, i.e., when changing over between operating modes, rapid charge changes in the combustion chambers can result in clearly noticeable, erratic changes in the level of torque output by the internal combustion engine.

The present invention is based on the object of preventing torque jumps during operation of an internal combustion engine in a certain operating state, e.g., when shutting down cylinders or when changing over to a different operating mode.

To attain this object, the invention proposes, based on the method of the type mentioned initially, that the charging of the combustion chambers with fuel and air or with a fuel/air mixture be controlled individually for each combustion chamber via open-loop or closed-loop control.

SUMMARY OF THE INVENTION

With the method according to the invention, it is possible, for the first time, to charge the combustion chambers of individual cylinders of an internal combustion engine in order to actively influence the operating state of the internal combustion engine. The core of the invention is not to compensate for charge differences individual to each cylinder, but rather to intentionally charge the combustion chambers of the internal combustion engine with different charges. The charges can differ according to the amount of fuel or air, or in terms of the composition of the fuel/air mixture with which the individual combustion chambers of the internal combustion chamber are charged. The charge of the combustion chambers can be controlled via open-loop or closed-loop control, e.g., via electromechanically or electrohydraulically-controlled intake or exhaust valves or via the injection valves.

With the method according to the invention, torque jumps that occur, e.g., when individual cylinders of an internal combustion engine are shut down, or when changing over to a different operating mode of a direct-injection internal combustion engine, are prevented by means of a suitable open-loop or closed-loop control of the charge of the individual cylinder chambers. Moreover, depending on the operating state of the internal combustion engine, any number of cylinders can be shut down. It would even be feasible to activate and/or shut down each individual cylinder of an internal combustion engine depending on the load being placed on said internal combustion engine.

In a steady-state operation of the internal combustion engine, some of the combustion chambers can be operated with full charge and the other combustion chambers can be operated with just a partial charge. As a result, a stratified charge, for example, can be realized in the cylinders with full charge and, in fact, at the operating points that would require that the entire internal combustion engine be operated with a homogeneous mixture ("throttled operation") due to the torque required by the internal combustion engine when all combustion chambers are charged uniformly. A marked reduction in fuel consumption can be achieved as a result.

During dynamic operation of the internal combustion engine, i.e., when changing over between various operating modes, a sudden, undesired change in the torque output by the internal combustion engine can be prevented with the method according to the invention by means of targeted open-loop or closed-loop control of the charging of the combustion chambers. Feasible operating modes include, for instance, homogeneous operation, stratified-charge operation, lean-burn stratified-charge operation, operation for catalytic-converter heating, operation for desulfurization of the catalytic converter, or operation for NOx (oxides of nitrogen) regeneration.

With the method according to the invention, torque jumps can therefore be prevented when one or more cylinders are shut down, or when changing over to a different operating mode of the internal combustion engine. Additionally, the method according to the invention results in a reduction in fuel consumption, particularly during steady-state operation.

According to an advantageous further development of the present invention, it is proposed that the charging of the combustion chambers with fuel and air or with a fuel/air mixture be determined individually for each combustion chamber. Based on the value determined for the actual charging of the combustion chambers, the charging of the combustion chambers can be governed to a specifiable setpoint value.

According to a preferred exemplary embodiment of the present invention, it is proposed that the charging be measured by means of a charge sensor individual to each combution chamber. A compression chamber pressure sensor, for example, can be used as charge sensor. The output signal of the charge sensor represents the actual charge in the combustion chamber.

According to an alternative exemplary embodiment of the present invention, it is proposed that the charging be modelled based on a level of torque detected individually for each combustion chamber. The level of torque that is detected can be either the actual torque or a setpoint torque. With reference to a torque model, the cylinder-specific charge of the individual combustion chambers can be modelled based on the actual torque as well as the setpoint torque. In a reciprocal application, and calculated individually for each cylinder, the torque model can also be used to calculate the number of cylinders that must be operated with a homogeneous mixture in order to obtain a required setpoint torque. Stratified-charge operation continues in the rest of the cylinders, which provides good fuel economy.

According to another advantageous further development of the present invention, it is proposed that, to shut down cylinders, the charging of the combustion chambers of the cylinders to be shut down be reduced with a time delay between each one.

According to yet another advantageous further development of the present invention, it is proposed—for direct-injection internal combustion engines, in the case of which the combustion chambers are charged directly with fuel and air—that, to change the operating mode of the internal combustion engine, the charge of the combustion chambers be adapted to the operating mode to be switched to with a time delay between each one. For example, when changing over from stratified-charge operation to homogenous operation, all cylinders are not changed over simultaneously. Instead, the individual cylinders are switched to homogeneous operation in succession with a time delay between each one. Adaptation of the charge to a certain operating mode comprises, e.g., the amount of fuel and air, the start of injection, and the composition of the fuel/air mixture.

According to yet another advantageous further development of the present invention, it is proposed for direct-injection internal combustion engines that a certain number of combustion chambers be operated with a charge corresponding to homogeneous operation and the remaining combustion chambers be operated with a charge corresponding to stratified-charge operation, in accordance with a setpoint torque required by the internal combustion engine. In this manner, the torque output by the internal combustion engine can be adapted individually to a load being placed on the internal combustion engine. When a load being placed on an internal combustion engine that is greater than a level of torque that can be output by the internal combustion engine in stratified-charge operation, then it is no longer necessary—as it used to be—to switch all cylinders in the internal combustion engine to homogeneous operation. Instead, the fewest number of cylinders of the internal combustion engine as possible are operated in homogeneous operation that still allows the internal combustion engine to output just enough torque to correspond to the load being applied. In steady-state operation of the internal combustion engine, this results in a considerable reduction in fuel consumption.

Of particular significance is the realization of the method according to the invention in the form of a memory element that is provided for an electronic control unit of an internal combustion engine. A computer program is stored in the memory element, which said computer program can be run in a computing element, in particular in a microprocessor, and which is suitable for carrying out the method according to the invention. In this case, the invention is therefore realized by means of a program stored in the memory element, so that this memory element equipped with the computer program represents the invention in the same fashion as the method that the computer program is suited to carry out. An electrical memory medium is particularly suited for use as the memory element, e.g., a read-only memory, a random-access memory, or a flash memory.

The invention also concerns a computer program that is suitable for carrying out the method according to the invention when it runs on a computing element, in particular on a microprocessor. It is particularly preferrable for the computer program to be stored on a memory element for an electronic control unit of an internal combustion engine. The memory element is developed, in particular, as a read-only memory, as a random-access memory, or as a flash memory.

As a further means of attaining the object of the invention, it is proposed—based on the electronic control unit for an internal combustion engine of the type named initially—that the electronic control unit control—via open-loop or closed-loop control—the charging of the combustion chambers with fuel and air or with a fuel/air mixture individually for each combustion chamber.

Finally, as a means of attaining the object of the present invention, it is proposed—based on the internal combustion engine of the type named initially—that the charging of the combustion chambers with fuel and air or with a fuel/air mixture be controllable—via open-loop or closed-loop control—individually for each combustion chamber.

Further features, potential applications, and advantages of the invention result from the subsequent description of exemplary embodiments of the invention that are presented in the drawings. All described or depicted features form the object of the invention alone or in any combination, independent of their summarization in the claims or their back reference, and independent of their formulation and/or depiction in the description and/or in the drawings.

DESCRIPTION OF THE PREFERRED EMBODIMENTS

Figure 1:
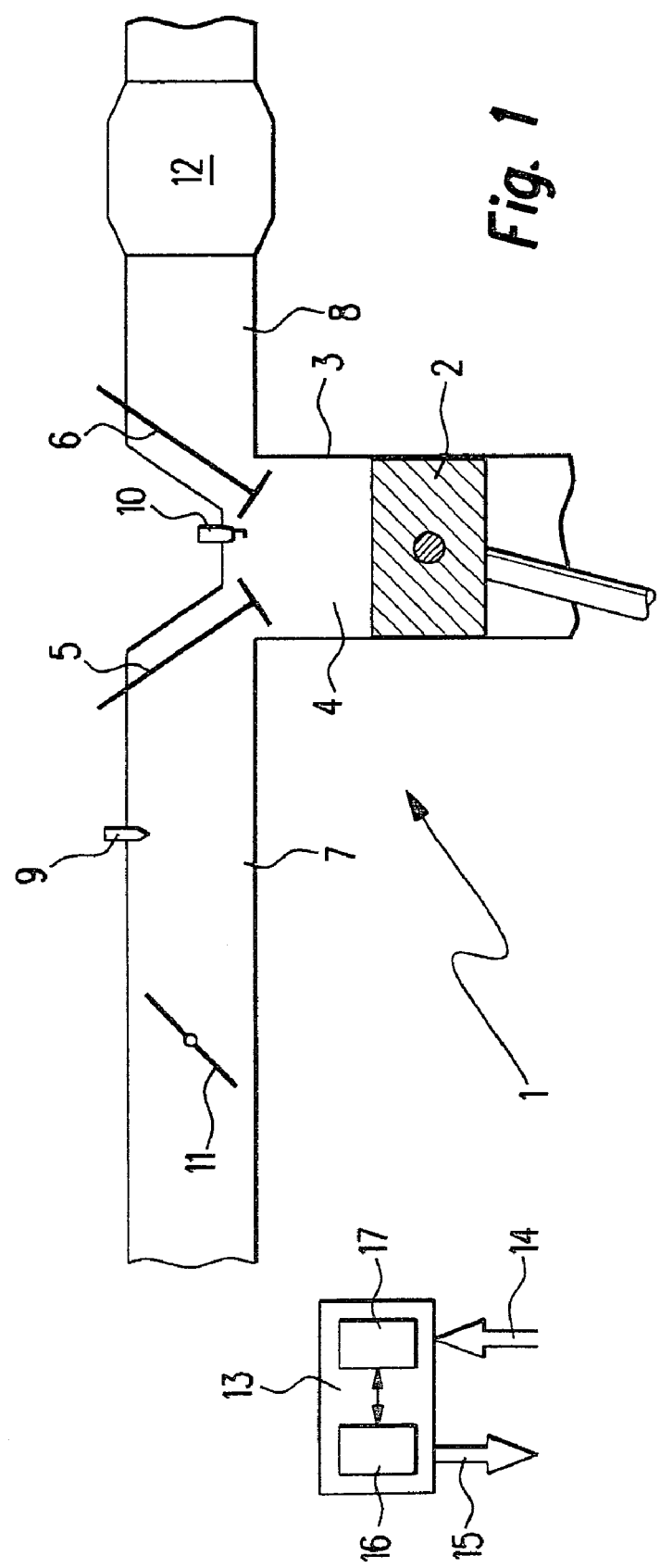
FIG. 1 is a block diagram of an internal combustion engine according to the invention according to a first preferred exemplary embodiment.

FIG. 1 is an illustration of an internal combustion engine of a motor vehicle according to the invention, labelled in entirety with reference numeral 1. In the case of the internal combustion engine 1, a piston 2 is situated in a cylinder 3 in a manner that allows it to perform a reciprocating motion. The cylinder 3 is equipped with a combustion chamber 4 that is bordered by the piston 2, an intake valve 5, and an exhaust valve 6, among other things. An intake manifold 7 is coupled with the intake valve 5, and an exhaust manifold 8 is coupled with the exhaust valve 6. Instead of just one intake valve 5 and one exhaust valve 6, a plurality of intake valves 5 and/or exhaust valves 6 can also be provided.

The internal combustion engine 1 comprises a plurality of such cylinders 3, only one of which is shown in FIG. 1.

A fuel injector 9 projects into the intake manifold 7, via which fuel can be injected into the intake manifold 7. The sprayed fuel combines with air in the intake manifold 7 to form a fuel/air mixture that travels through the intake valve 5 and into the combustion chamber 4. A spark plug 10 projects into the combustion chamber 4 in the region of the intake valve 5 and the exhaust valve 6, with which the fuel/air mixture can be ignited in the combustion chamber 4.

A turnable throttle valve 11 is situated in the intake manifold 7, via which air can be supplied to the intake manifold 7. The amount of supplied air depends on the angular position of the throttle valve 11. A catalytic converter 12 is located in the exhaust manifold 8, which said catalytic converter serves to clean exhaust gases produced by the combustion of fuel.

The piston 2 is set into a reciprocating motion by the combustion of fuel in the chamber 4, which said reciprocating motion is transferred to a not-shown crankshaft and exerts torque on said crankshaft.

An electronic control unit 13 is acted upon by input signals 14 that represent operating variables of the internal combustion engine 1 measured using sensors. For example, the electronic control unit 13 is interconnected with an air-mass sensor, a lambda sensor, a speed sensor, and the like. The electronic control unit 13 generates output signals 15, with which the behavior of the internal combustion engine 1 can be influenced via actuators and control elements. For example, the electronic control unit 13 is interconnected with the fuel injector 9, the spark plug 10, the throttle valve 11, and actuators to actuate the intake and exhaust valves 5, 6 and the like, and it generates the signals required to trigger them.

The electronic control unit 13 is provided, e.g., to control the operating variables of the internal combustion engine 1 via open-loop or closed-loop control. For example, the fuel mass sprayed into the intake manifold 7 by the fuel injector 9 is controlled via open-loop and/or closed-loop control by the electronic control unit 13 with regard for low fuel consumption and/or low fuel emissions in particular. For this purpose, the electronic control unit 13 is equipped with a microprocessor 16 that runs a program that is suitable for carrying out the stated open-loop and/or closed-loop control. The program is stored in a memory element 17, in particular in a flash memory, of the electronic control unit 13.

In the case of an internal combustion engine 1 having a large number of cylinders 3, in particular in the case of 6-cylinder or 12-cylinder internal combustion engines, the method according to the invention (refer to FIG. 3) allows a variable number of cylinders 3 to be shut down in certain operating states of the internal combustion engine 1, e.g., in part-load operation or in overrun.

The method according to the invention for shutting down cylinders 3 starts in a function module 20. In a function module 21, the internal combustion engine 1 is operated with all available cylinders 3. In an inquiry block 22, a load being placed on the internal combustion engine 1 is compared with a level of torque being output by the internal combustion engine 1. If the load being placed thereon is nearly equal to the level of torque being output, the process returns to function module 21, and the internal combustion engine 1 continues to operate with all available cylinders 3.

If the load being placed on the internal combustion engine 1 is less than the torque being output by the internal combustion engine 1, however, the process jumps to a function module 23, where the number of cylinders 3 is determined that actually need to operate in order to output a level of torque corresponding to the load being applied. The difference between the total number of cylinders 3 and the number of cylinders 3 required is the number of cylinders 3 that can be shut down. In a function module 24, one of the cylinders 3 to be shut down is shut down.

To accomplish this, the capacity of the combustion chamber 4 assigned to the cylinder 3 to be shut down is reduced to zero. This can take place, for example, by deactivating the appropriate intake valve 5, so that no fuel/air mixture can reach the combustion chamber 4. As an alternative, the injected fuel mass can be reduced to zero by means of suitable control of the fuel injector 9.

A check is then carried out in an inquiry block 25 to determine if all cylinders 3 to be shut down have already been shut down. If additional cylinders 3 remain to be shut down, the process jumps via a function module 26 to function module 24, where the next cylinder 3 to be shut down is shut down. In function module 26, the procedure is temporarily delayed. As a result of this, the cylinders 3 to be shut down are shut down with a time delay between each one. This prevents sudden torque jumps from occurring when the cylinders 3 are shut down.

If all cylinders 3 to be shut down are shut down, the internal combustion engine 1 is operated in a function module 27 with a reduced number of cylinders. In function module 28, the method according to the invention is terminated. The activation of additional cylinders 3 can take place in similar fashion.

Figure 2:
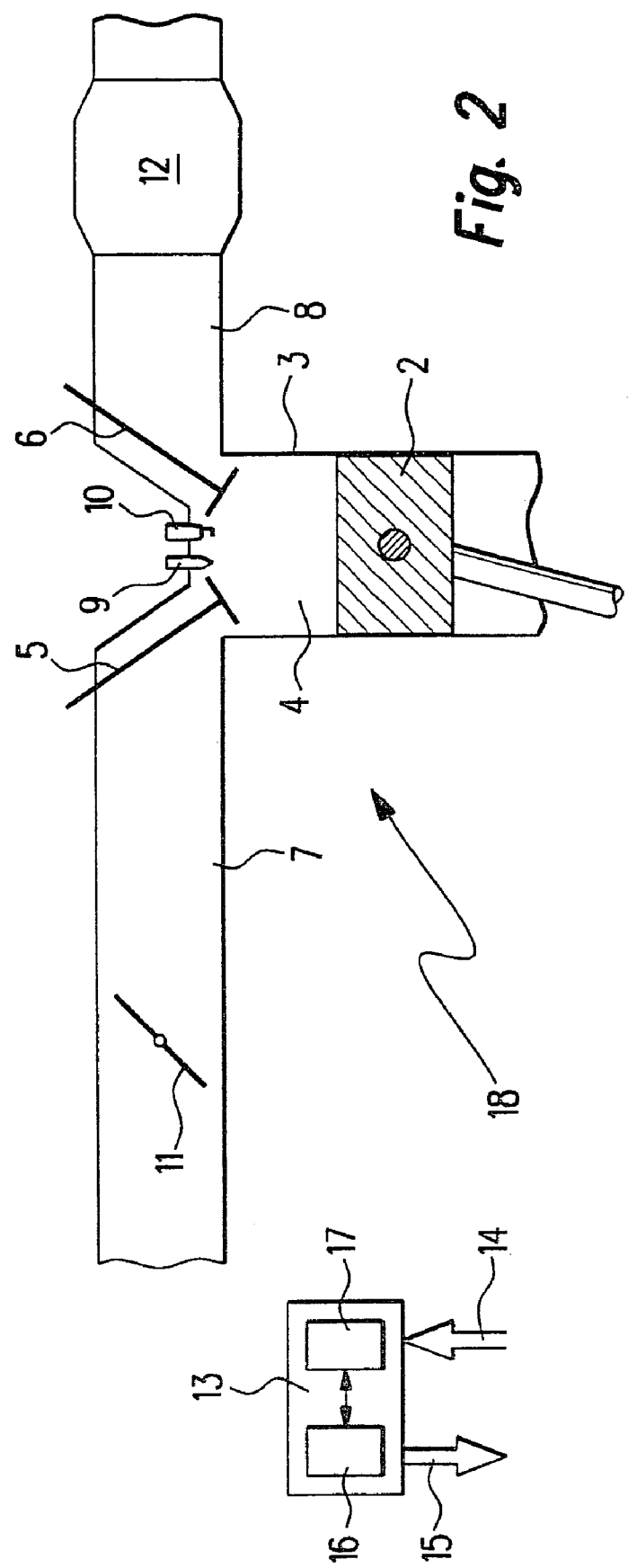
FIG. 2 is a block diagram of an internal combustion engine according to the invention according to a second preferred exemplary embodiment.
Figure 3:
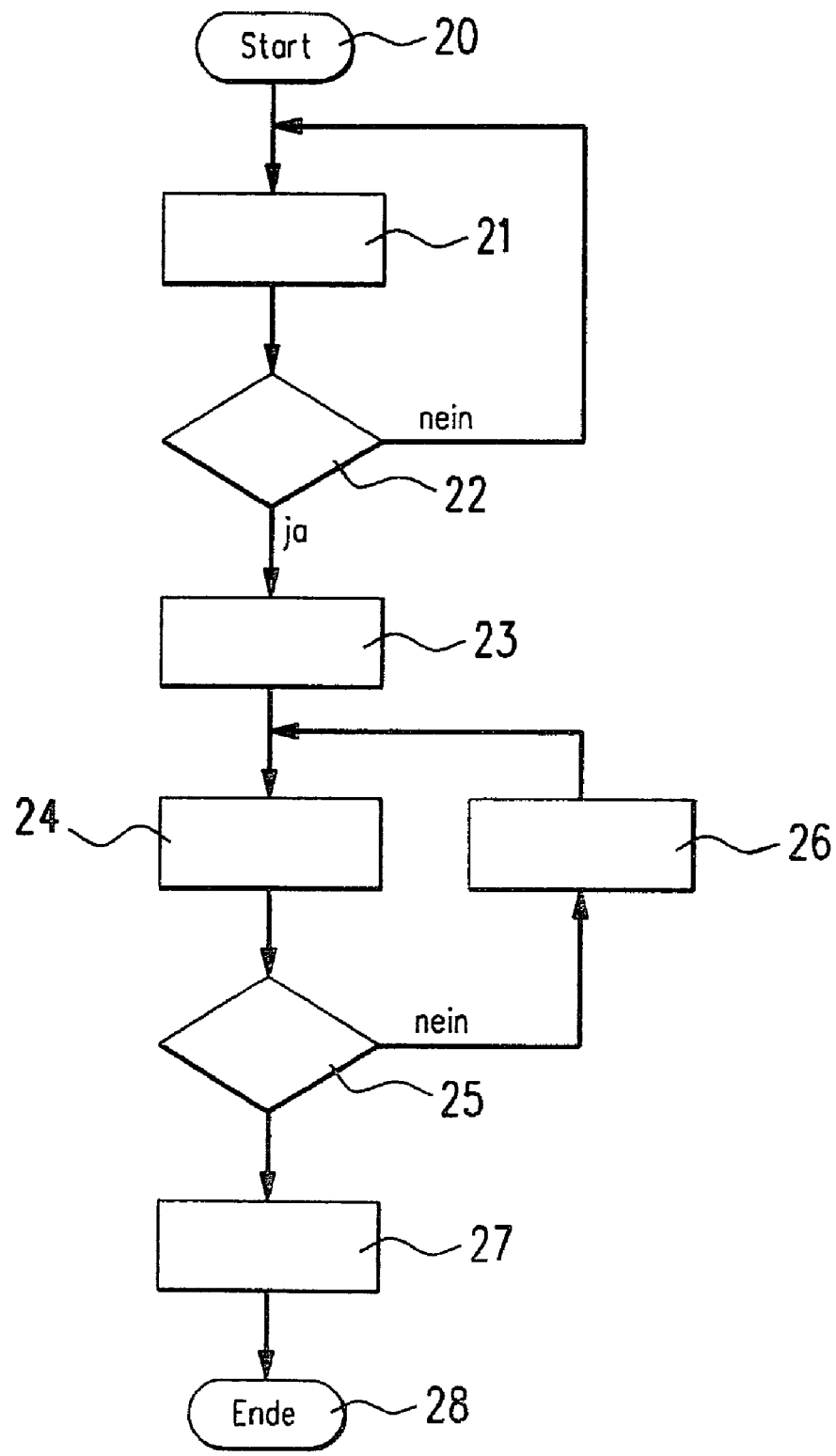
FIG. 3 is a flow chart of a method, according to the invention, according to a first preferred exemplary embodiment.

The method in FIG. 3, which was explained with reference to the internal combustion engine 1 with manifold injection in FIG. 1, can also be used with a direct-injection internal combustion engine 18, of course, as shown in FIG. 2. In the case of the internal combustion engine 18 in FIG. 2, the fuel injector 9 projects into the combustion chamber 4 in the region of the intake valve 5 and the exhaust valve 6. The direct-injection internal combustion engine 18 can be operated in a number of different operating modes. It is possible, for example, to operate the internal combustion engine 18 in a homogeneous operation, a stratified-charge operation, a homogeneous lean-burn operation, an operation to heat the catalytic converter 12, an operation to desulfurize the catalytic converter 12, an operation for regeneration of a NOx (oxides of nitrogen) storage catalyst, or the like.

In homogeneous operation, fuel is sprayed by the fuel injector 9 directly into the combustion chamber 4 of the internal combustion engine 18 during the intake phase. As a result, the fuel is still swirled extensively until ignition takes place, so that a substantially homogeneous fuel/air mixture is produced in the combustion chamber 4. The level of torque to be generated is adjusted essentially by the electronic control unit 13 via the position of the throttle valve 11. In homogeneous operation, the operating variables of the internal combustion engine 18 are controlled via open-loop and/or closed-loop control in such a fashion that lambda is equal to zero. Homogeneous operation is used with wide-open throttle in particular.

Homogenous lean-burn operation is substantially similar to homogeneous operation, but lambda is set to a value less than 1.

In stratified-charge operation, fuel is sprayed by the fuel injector 9 directly into the combustion chamber 4 of the internal combustion engine 18 during the compression phase. A homogeneous mixture is therefore not present in the combustion chamber 4 when ignition by the spark plug 10 takes place; instead, a coating of fuel is present. Apart from requirements, e.g., exhaust-gas recirculation and/or tank ventilation, the throttle valve 11 can be opened completely, and the internal combustion engine 18 can therefore be operated unthrottled. The level torque to be generated is adjusted largely via the injected fuel mass in stratified-charge operation. With stratified-charge operation, the internal combustion engine 18 can be operated at idle, in part-load operation or in overrun, in particular.

Alternation back and forth between the stated operating modes of the internal combustion engine 18 can take place. Changeovers of this nature are carried out by the electronic control unit 13. To this end, a further program is stored on the memory element 17 that can be run on the microprocessor 16 and is suitable for performing the open-loop or closed-loop control of the operating mode of the internal combustion engine 18.

Figure 4:
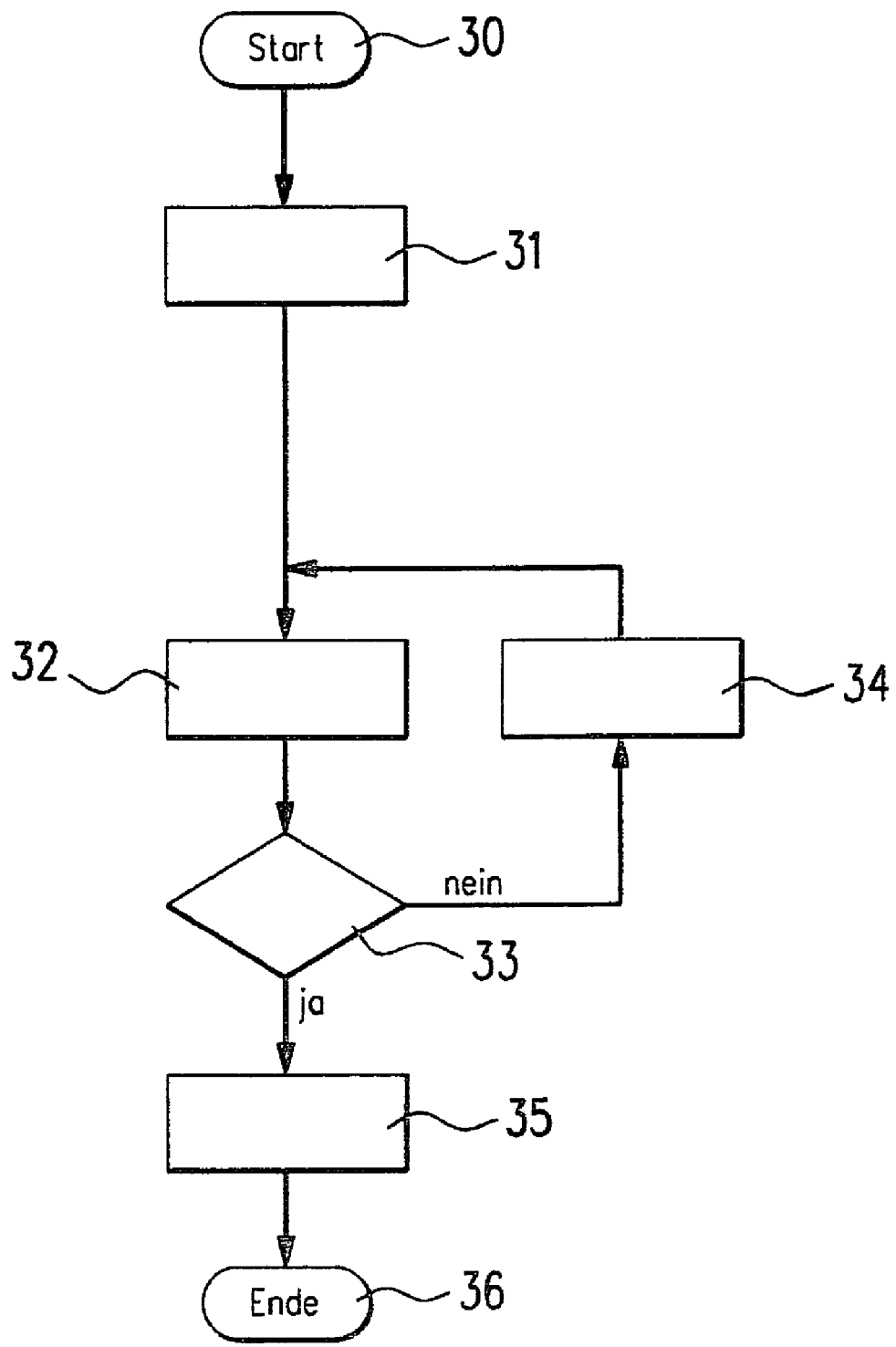
FIG. 4 is a flow chart of a method, according to the invention, according to a preferred exemplary embodiment.

A flow chart of a method according to the invention for changing the operating mode of the internal combustion engine 18 (installed operation) is shown in FIG. 4. The method begins in a function module 30. In a function module 31, the internal combustion engine 18 is operated in a first operating mode (stratified-charge operation). Since stratified-charge operation, as described hereinabove, is only suitable for low loads, a second operating mode (homogeneous operation) must be switched to when greater loads are placed on the internal combustion engine 1. According to the invention, all cylinders 3 of the internal combustion engine 18 are not changed over to homogeneous operation simultaneously; this prevents sudden torque jumps from occurring when alternating between operating modes.

In a function module 32, one of the cylinders 3 is changed over to homogenous operation by charging it with a charge corresponding to homogeneous operation. A check is then carried out in an inquiry block 33 to determine if all cylinders 3 were changed over to homogeneous operation. If additional cylinders 3 remain to be changed over, the process jumps via a function module 34 to function module 32, where the next cylinder 3 is switched to homogeneous operation by filling the combustion chamber 4 assigned to this cylinder 3 with a charge corresponding to homogeneous operation. In function module 34, the procedure of carrying out the method according to the invention is temporarily delayed, so that the individual cylinders 3 are switched with a time delay between each one. As a result of this, torque jumps are prevented when switching between operating modes. A changeover from homogeneous operation to stratified-charge operation, or a changeover between any other operating modes can take place according to the method described.

Figure 5:
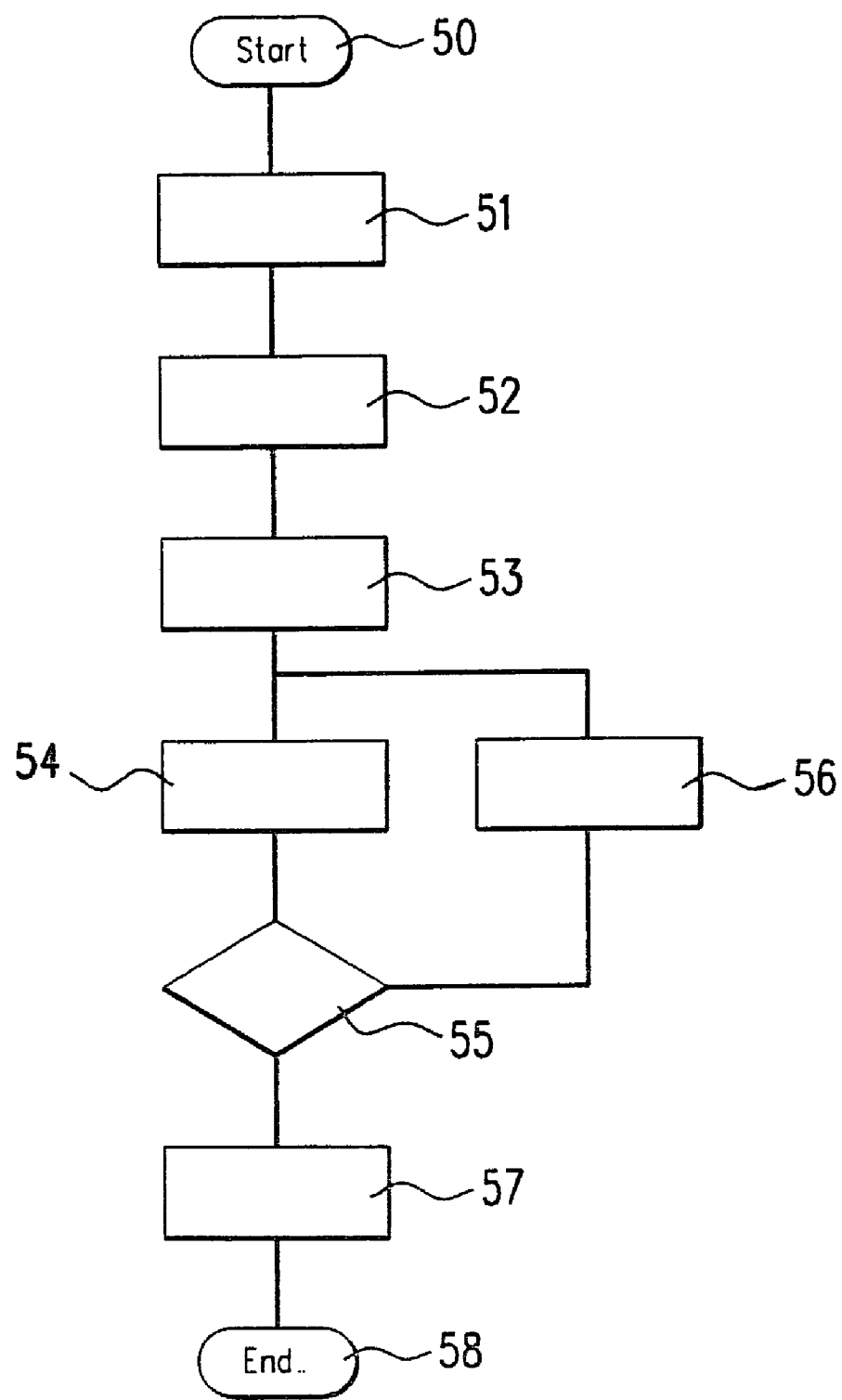
FIG. 5 is a method, according to the invention, according to a third preferred exemplary embodient.

A flow chart of a further method according to the invention for operating an internal combustion engine 18 in a steady-state operation is shown in FIG. 5. The method starts in a function module 50. In a function module 51, the internal combustion engine 18 is operated in a first operating mode (stratified-charge operation). In a function module 52, a higher level of torque is required, since a higher load is being placed on the internal combustion engine 1. According to the invention, however, not all cylinders 3 of the internal combustion engine 18 are changed over to homogeneous operation, just a number of cylinders 3 required to output a level of torque that is greater than the load being applied. In a function module 53, the number of cylinders 3 is determined that must be operated in homogeneous operation so that the internal combustion engine 18 can output the level of torque required.

In a function module 54, one of the cylinders 3 to be changed over is first switched to homogeneous operation by charging the combustion chamber 4 assigned to this cylinder 3 with a charge corresponding to homogeneous operation. A check is then carried out in an inquiry block 55 to determine if all cylinders 3 to be changed over to homogeneous operation have already been changed over to homogeneous operation. If additional cylinders 3 remain to be changed over to homogeneous operation, the process jumps via a function module 56 back to function module 54, where a further cylinder 3 is changed over to homogeneous operation. In functional module 56, the procedure of carrying out the method according to the invention is temporarily delayed, so that the cylinders 3 to be switched can be changed over to homogeneous operation with a time delay between each one. As a result of this, torque jumps are prevented when alternating between operating modes.

Figure 6:
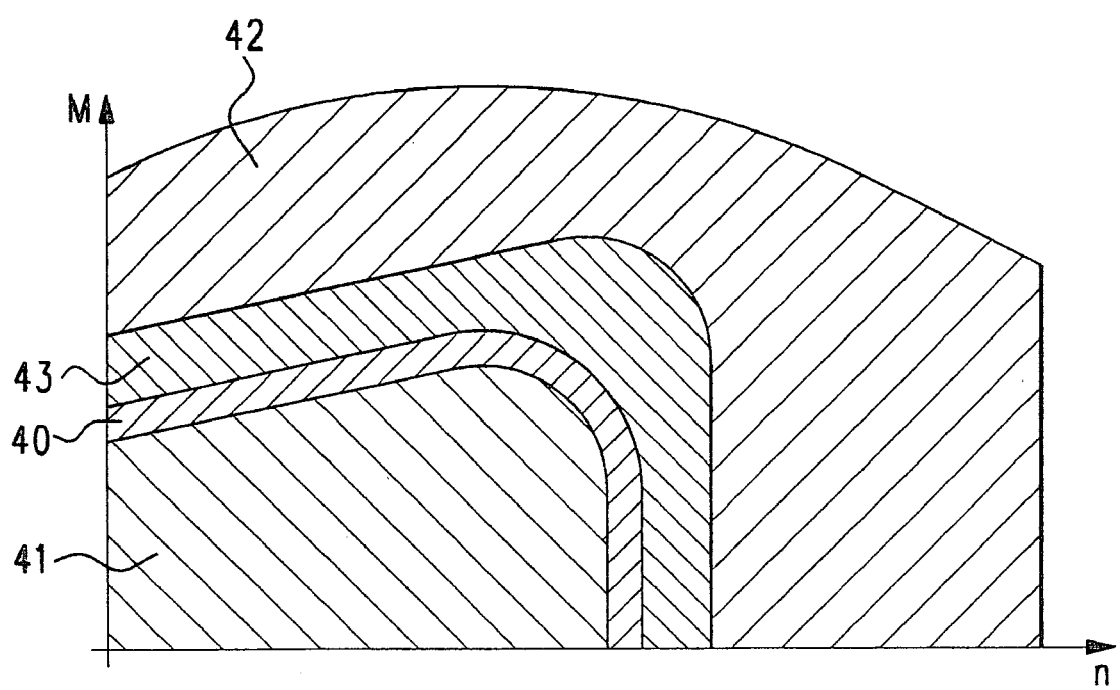
FIG. 6 is an operating program map based on FIG. 2.

If all cylinders 3 to be switched were changed over to homogeneous operation, the internal combustion engine 1 is operated for the time being in the "expanded operating mode" taking place at this time, in which some of the cylinders 3 of the internal combustion engine 1 are operated in homogeneous operation and the remaining cylinders 3 are operated in stratified-charge operation. An operating program map of the direct-injection internal combustion engine 18 in FIG. 2 is shown in FIG. 6. The operating program map is plotted against speed n and torque M. The expanded operating mode is labelled with reference numeral 40. Stratified-charge operation is labelled with reference numeral 41, homogeneous operation is labelled with reference numeral 42, and homogeneous lean-burn operation is labelled with reference numeral 43. The expanded operating range 40 extends past stratified-charge operation 41 into homogeneous lean-burn operation 43. The method according to the invention is terminated in function module 58.

By means of the method according to the invention presented in FIG. 5, it can be ensured that the internal combustion engine 18 outputs a level of torque corresponding to a higher load being applied, and that fuel can be saved, since only as many cylinders as necessary are operated in homogeneous operation, and as many cylinders 3 as possible are operated in stratified-charge operation.

What is claimed is:

1. A method of operating an internal combustion engine having a plurality of combustion chambers, comprising the steps of charging the combustion chambers with fuel and air or with a fuel/air mixture; determining an actual charging of the combustion chambers with fuel and air or with a fuel/air mixture individually for each combustion chamber; controlling the charging of the combustion chambers with fuel and air or with a fuel/air mixture individually via a control selected from the group consisting of an open-loop control and a closed-loop control for each combustion chamber; and measuring the actual charging of the combustion chambers by means of a charge sensor individual to each combustion chamber.

2. A method as defined in claim 1; and further comprising in order to shut down cylinders, reducing the charging of the combustion chambers of the cylinders to be shut down with a time delay between each one.

3. A method as defined in claim 1; and further comprising, in order to switch an operating mode of the internal combustion engine, adapting the charging of the combustion chambers to the operating mode to be switched to with a time delay between each one.

4. A method as defined in claim 1; and further comprising charging the combustion chambers with fuel and air directly; operating a certain number of combustion chambers with a homogenous-charged operation; and operating remaining combustion chambers with a stratified-charge operation, in accordance with a level torque required by the internal combustion engine.

5. A computer program storable on a readable storage medium and programmed to carry out a method of operating an internal combustion engine having a plurality of combustion chambers, comprising the steps of charging combustion chambers with fuel and air or with a fuel/air mixture, determining an actual charging of the combustion chambers with fuel and air or with a fuel/air mixture individually for each combustion chamber, controlling the charging of the combustion chambers with fuel and air or with a fuel/air mixture individually via a control selected from the group consisting of an open-loop control and a closed-loop control for each combustion chamber, and measuring the actual charging of the combustion chambers by means of a charge sensor individual to each combustion chamber.

6. An electrical memory medium formed as a readable storage medium for a control device selected from the group consisting of an open-loop control device and a closed-loop control device of an internal combustion engine, the electrical memory medium having a computer program storable on the electrical memory medium and programmed to carry out a method of operating an internal combustion engine having a plurality of combustion chambers, comprising the steps of charging the combustion chambers with fuel and air or with a fuel/air mixture, determining an actual charging of the combustion chambers with fuel and air or with a fuel/air mixture individually for each combustion chamber, controlling the charging of the combustion chambers with fuel and air or with a fuel/air mixture individually via a control selected from the group consisting of an open-loop control and a closed-loop control for each combustion chamber, and measuring the actual charging of the combustion chambers by means of a charge sensor individual to each combustion chamber.

7. An electrical memory medium as defined in claim 6, wherein the memory medium is developed as a medium selected from the group consisting of a read-only memory, a random-access memory, and a flash memory.

8. A control device selected from the group consisting of an open-loop control device and a closed-loop control device for an internal combustion engine provided with means for charging combustion chamber with fuel and air or with a fuel/air mixture, the control device having means for controlling the charging of the combustion chambers with fuel and air or with a fuel/air mixture individually via a control selected from the group consisting of an open-loop control and a closed-loop control for each combustion chamber; and means for measuring the actual charging of the combustion chambers by means of a charge sensor individual to each combustion chamber.

9. An internal combustion engine for a motor vehicle, comprising a control device selected from the group consisting of an open-loop control device and a closed-loop control device and having means for charging combustion chambers with fuel and air or with a fuel/air mixture; means for determining an actual charging of the combustion chambers with fuel and air or with a fuel/air mixture individually for each combustion chamber; means for controlling the charging of the combustion chambers with fuel and air or with a fuel/air mixture individually via a control selected from the group consisting of an open-loop control and a closed-loop control for each combustion chamber; and means for measuring the actual charging of the combustion chambers by means of a charge sensor individual to each combustion chamber.

10. A method of operating an internal combustion engine having a plurality of combustion chambers, comprising the steps of charging the combustion chambers with fuel and air or with a fuel/air mixture; determining an actual charging of the combustion chambers with fuel and air or with a fuel/air mixture for each combustion chamber individually; controlling the charging of the combustion chambers with fuel and air or with a fuel/air mixture individually via a closed-loop control for each combustion chamber, and in order to shut down the cylinders, reducing the charging of the combustion chambers in the cylinders to be shut down with a time delay between each one.

11. A method as defined in claim 10; and further comprising measuring the charging by means of a charge sensor individual to each combustion chamber.

12. A method as defined in claim 11; and further comprising charging the combustion chambers with fuel and air directly; and in order to switch the operating mode of the internal combustion engine, adapting the charge of the combustion chambers to the operating mode to be switched too with a time delay between each one.

13. A method as defined in claim 10; and further comprising modeling a charge based on a level torque detected individually for each combustion chamber.

14. A method as defined in claim 10; and further comprising charging the combustion chambers with fuel and air directly; and cooperating a certain number of combustion chambers with a homogenous-charge operation, and operating a remaining combustion chambers with a stratified-charge operation in accordance with a level torque required by the internal combustion engine.

15. A computer program storable on a readable storage medium and programmed to carry out a method of operating an internal combustion engine having a plurality of combustion chambers, comprising the steps of charging the combustion chamber switch fuel and air or with a fuel/air mixture, determining an actual charging of the combustion chambers with fuel and air or with a fuel/air mixture for each combustion chamber individually, controlling the charging of the combustion chambers with fuel and air or with a fuel/air mixture individually via a closed-loop control for each combustion chamber, and in order to shut down the cylinders, reducing the charging of the combustion chambers in the cylinders to be shut down with a time delay between each one.

16. An electrical memory medium formed as a readable storage medium for a control device selected from the group consisting of an open-loop control device and a closed-loop control device of an internal combustion engine, the electrical memory medium having a computer program storable on the electrical memory medium and programmed to carry out a method of operating an internal combustion engine having a plurality of combustion chambers, comprising the steps of charging the combustion chambers with fuel and air or with a fuel/air mixture, determining an actual charging of the combustion chambers with fuel and air or with a fuel/air mixture for each combustion chamber individually, controlling the charging of the combustion chambers with fuel and air or with a fuel/air mixture individually via a closed-loop control for each combustion chamber, and in order to shut down the cylinders, reducing the charging of the combustion chambers in the cylinders to be shut down with a time delay between each one.

17. An electrical memory medium as defined in claim 16, wherein the memory medium is developed as a medium selected from the group consisting of a read-only memory, a random-access memory, and a flash memory.

18. A control device selected from the group consisting or an open-loop control device and a closed-loop control device for an internal combustion engine provided with means for charging combustion chambers with fuel and air or with a fuel/air mixture, the control device having means for controlling the charging of the combustion chambers with fuel and air or with a fuel/air mixture individually via a closed-loop control for each combustion chamber, and in order to shut down the cylinders, means for reducing the charging of the combustion chambers in the cylinders to be shut down with a time delay between each one.

19. An internal combustion engine for a motor vehicle provided with means for charging combustion chambers with fuel and air or with a fuel/air mixture, comprising a control device selected from the group consisting of an open-loop control device and a closed-loop control device and having means for determining an actual charging of the combustion chambers with fuel and air or with a fuel/air mixture for each combustion chamber individually, means for controlling the charging of the combustion chambers with fuel and air or with a fuel/air mixture individually via a closed-loop control for each combustion chamber, and in order to shut down the cylinders, means for reducing the charging of the combustion chambers in the cylinders to be shut down with a time delay between each one.

20. A method of operating a direct-injection internal combustion engine having a plurality of combustion chambers, comprising the steps of charging the combustion chambers with fuel and air or with a fuel/air mixture; determining an actual charging of the combustion chambers with fuel and air or with a fuel/air mixture individually for each combustion chamber; controlling the charging of the combustion chambers with fuel and air or with a fuel/air mixture individually via a closed-loop control for each combustion chamber; and in order to switch the operating mode of the internal combustion engine, adapting the charging of the combustion chambers to the operating mode to be switched to with a time delay between each combustion chamber.

21. A method as defined in claim 20; and further comprising operating a certain number of combustion chambers with homogenous-charge operation; and operating a remaining combustion chambers with a stratified-charge operation in accordance with a torque required of the internal combustion engine.

22. A method as defined in claim 20; and further comprising, in order to shut down cylinders, reducing a charge of the combustion chambers of the cylinders to be shut down with a time delay between each one.

23. A method as defined in claim 20; and further comprising measuring the charge by means of a charge sensor individual to each combustion chamber.

* * * * *